Patented Jan. 21, 1947

2,414,561

UNITED STATES PATENT OFFICE 2,414,561

METHOD OF PURIFYING QUINACRINE HYDROCHLORIDE

James E. Rundell, North Chicago, and Taisto A. Aho, Waukegan, Ill., assignors to Abbott Laboratories, North Chicago, Ill., a corporation of Illinois No Drawing. Application November 30, 1944, Serial No. 566,033

6 Claims. (Cl. 260—279)

The object of this invention is to provide an improved method for preparing derivatives of acridine, and more specifically, an improved method of preparing quinacrine dihydrochloride. Quinacrine is the most popular member of a group of compounds, all derivatives of acridine, which are useful in the treatment of malaria.

EXAMPLE I

Crude quinacrine hydrochloride

To 675 parts by weight of U. S. P. phenol add 600 parts of 2 methoxy-6,9-dichloroacridine at 45–55° C. and stir until uniformly mixed. Add rapidly 341 parts of 100% 1-diethyl-amino-4-amino-pentane with stirring and cooling; the temperature of the reaction should be controlled between 95° and 100° C. and the melt is held at this temperature for six hours.

At the end of the heating period apply cooling and add under reflux 400 parts of acetone. Cool with stirring to 20° C. and add rapidly 256 parts of concentrated CP hydrochloric acid containing from 35% to 38% HCl. Continue cooling and adjust the pH to a range of 4.6–4.8 with additional small amounts of hydrochloric acid. Cool to 20° C. with stirring and centrifuge out the crude solid quinacrine hydrochloride. Form a slurry with the centrifuged mass and 280 parts of fresh acetone, and centrifuge the solid out again. This removes traces of phenol.

EXAMPLE II

Purification

Dissolve the product of Example I in water at 50–55° C. in the presence of about one part of decolorizing carbon to about 20 parts of the product, and after the product is completely dissolved separate impurities by filtration.

To filtrate containing about 160 parts of the product dissolved in about 500 parts of water add a previously prepared and filtered solution of 19 parts of technical calcium chloride dissolved in 33 parts water and stir the mixture while cooling to 30° C. This results in salting out crystals, some of which are small, and the mechanical properties of such crystals, if separated, would be relatively undesirable. To eliminate this characteristic, the mixture is now slowly heated to a point where all the fine crystals have gone back into solution but enough of the large crystals remain undissolved to form nuclei for redeposition of the dissolved material. This will involve heating to from 50° to 60° C. The mixture is now gradually cooled with stirring at a rate of about 2° C. per hour down to 20° C. The crystals are now centrifuged as dry as possible and the moist cake may advantageously be made up to a slurry with 28 parts of acetone and centrifuged dry again. A second formation of a slurry with a second 28 parts of acetone is also advantageous. Finally the centrifuged crystals are spread on trays and dried for eight hours at 55° C.

United States Patent 2,113,357 recites several methods for the preparation of quinacrine, but none of the methods disclosed in that patent appear to be comparable to the method of the present invention, either with respect to effectiveness and convenience in procedure, or with respect to the purity and quality of the product obtainable.

Without further elaboration the foregoing will so fully explain the invention that others may readily adapt the same for use under various conditions of service.

We claim:

1. The method of producing quinacrine in a condition of purity suitable for medicinal use, which comprises: reacting 2-methoxy-6,9-dichloroacridine with 1-diethylamino-4-aminopentane in the presence of phenol; precipitating the resulting quinacrine in the form of the hydrochloride from acetone to secure crude solid quinacrine hydrochloride; dissolving the crude hydrochloride in water; subjecting the solution to the action of decolorizing carbon; removing impurities by filtering; from the filtrate precipitating quinacrine hydrochloride by the addition of calcium chloride; cooling the mixture to about 30° C.; reheating the mixture to from 50° C. to 60° C., the reheating being for a time and to a temperature sufficient to dissolve the fines while leaving enough of the large crystals still partly undissolved to form nuclei for redeposition of the dissolved material; and then cooling slowly with stirring at a rate of about 2° C. per hour down to 20° C.; separating the crystals by centrifuging, and washing the centrifuged crystals repeatedly by adding acetone to make a slurry and removing the acetone by centrifuging.

2. The method of purifying quinacrine hydrochloride which comprises: precipitating quinacrine hydrochloride from an aqueous solution by the addition of calcium chloride; cooling the mixture; reheating the mixture for a time and to a temperature sufficient to dissolve fines while leaving enough crystals at least partly undissolved to form nuclei for redeposition of the dissolved material; cooling slowly with stirring; and separating the crystals.

3. The method of purifying quinacrine hydrochloride which comprises: precipitating quinacrine hydrochloride from an aqueous solution by the addition of calcium chloride; cooling the mixture to about 30° C.; reheating the mixture for a time and to a temperature sufficient to dissolve fines while leaving enough crystals at least partly undissolved to form nuclei for redeposition of the dissolved material; and then cooling slowly with stirring at the rate of about 2° C. per hour down to 20° C.; separating the crystals by centrifuging, and washing the centrifuged crystals repeatedly by adding acetone to make a slurry and removing the acetone by centrifuging.

4. The method of purifying quinacrine hydrochloride which comprises: dissolving the crude hydrochloride in water; precipitating quinacrine hydrochloride by the addition of calcium chloride; cooling the mixture to about 30° C.; reheating the mixture for a time and to a temperature sufficient to dissolve fines while leaving enough crystals at least partly undissolved to form nuclei for redeposition of the dissolved material; and then cooling slowly with stirring at the rate of about 2° C. per hour down to 20° C.; separating the crystals by centrifuging, and washing the centrifuged crystals repeatedly by adding acetone to make a slurry and removing the acetone by centrifuging.

5. The method of purifying quinacrine hydrochloride which comprises: dissolving the crude hydrochloride in water; removing impurities by filtering; from the filtrate precipitating quinacrine hydrochloride by the addition of calcium chloride; cooling the mixture to about 30° C.; reheating the mixture for a time and to a temperature sufficient to dissolve fines while leaving enough crystals at least partly undissolved to form nuclei for redeposition of the dissolved material; and then cooling slowly with stirring at the rate of about 2° C. per hour down to 20° C.; separating the crystals by centrifuging, and washing the centrifuged crystals repeatedly by adding acetone to make a slurry and removing the acetone by centrifuging.

6. The method of purifying quinacrine hydrochloride which comprises: dissolving the crude hydrochloride in water; subjecting the solution to the action of decolorizing carbon; removing impurities by filtering; from the filtrate precipitating quinacrine hydrochloride by the addition of calcium chloride; cooling the mixture to about 30° C.; reheating the mixture for a time and to a temperature sufficient to dissolve fines while leaving enough crystals at least partly undissolved to form nuclei for redeposition of the dissolved material; and then cooling slowly with stirring at the rate of about 2° C. per hour down to 20° C.; separating the crystals by centrifuging, and washing the centrifuged crystals repeatedly by adding acetone to make a slurry and removing the acetone by centrifuging.

JAMES E. RUNDELL.
TAISTO A. AHO.